(12) United States Patent
Preisler et al.

(10) Patent No.: US 10,766,172 B2
(45) Date of Patent: Sep. 8, 2020

(54) METHOD OF BONDING A THERMOPLASTIC COMPONENT TO A CARPETED COMPONENT

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 384 days.

(21) Appl. No.: 15/163,797

(22) Filed: May 25, 2016

(65) Prior Publication Data
US 2016/0263785 A1    Sep. 15, 2016

Related U.S. Application Data

(63) Continuation of application No. 13/517,877, filed on Jun. 14, 2012, now abandoned.

(51) Int. Cl.
*B60N 3/00* (2006.01)
*B32B 7/00* (2019.01)
(Continued)

(52) U.S. Cl.
CPC ............ *B29C 43/18* (2013.01); *B29B 13/022* (2013.01); *B29C 43/203* (2013.01); *B29C 43/52* (2013.01);
(Continued)

(58) Field of Classification Search
CPC ....... B29C 43/00; B29C 43/22; B29C 66/305; B29C 66/341; B29C 66/729; B29C 65/00;
(Continued)

(56) References Cited

U.S. PATENT DOCUMENTS 3,388,018 A * 6/1968 Squier ................. B29C 66/71
156/242
3,651,563 A    3/1972 Volkmann
(Continued)

OTHER PUBLICATIONS

U.S. Patent and Trademark Office, Notice of Allowance for U.S. Appl. No. 14/603,426, dated Jul. 13, 2020.

*Primary Examiner* — Jacob T Minskey
*Assistant Examiner* — Matthew Hoover
(74) *Attorney, Agent, or Firm* — Brooks Kushman P.C.

(57) ABSTRACT

A method of bonding a thermoplastic component to a carpeted component is provided. The method includes providing a base component, a thermoplastic component and a fibrous carpet or mat between the components. The carpet has a large number of cavities. The carpet is made of a thermoplastic material adapted to bond to the thermoplastic component in response to heat at the interface between the thermoplastic component and the carpet. The method also includes heating the thermoplastic component and the carpet at the interface between the thermoplastic component and the carpet for a period of time to soften the carpet. The method finally includes pressing the components and the softened carpet together under a pressure to cause the softened carpet to flow and at least partially fill the cavities. The carpet at the interface is transformed into a solid bonding layer to bond the components together to create a finished structure.

9 Claims, 2 Drawing Sheets

(51) Int. Cl.
| | | |
|---|---|---|
| *B29C 65/00* | (2006.01) | |
| *B32B 37/00* | (2006.01) | |
| *B29C 43/18* | (2006.01) | |
| *B32B 37/18* | (2006.01) | |
| *B29B 13/02* | (2006.01) | |
| *B29C 43/20* | (2006.01) | |
| *B29C 43/52* | (2006.01) | |
| *B29C 65/70* | (2006.01) | |
| *B29C 70/68* | (2006.01) | |
| *B32B 37/06* | (2006.01) | |
| *B29K 623/00* | (2006.01) | |
| *B29K 667/00* | (2006.01) | |
| *B29L 31/00* | (2006.01) | |

(52) U.S. Cl.
CPC ............. *B29C 65/70* (2013.01); *B29C 70/68* (2013.01); *B32B 37/182* (2013.01); *B29C 2043/189* (2013.01); *B29C 2043/525* (2013.01); *B29K 2623/12* (2013.01); *B29K 2667/00* (2013.01); *B29K 2713/00* (2013.01); *B29L 2031/7322* (2013.01); *B32B 37/06* (2013.01); *B32B 2309/02* (2013.01); *B32B 2309/12* (2013.01); *B32B 2398/20* (2013.01); *B32B 2471/02* (2013.01)

(58) Field of Classification Search
CPC ..... B32B 7/042; B32B 3/263; B32B 2605/00; B32B 2605/003; B32B 2471/00; B32B 2471/02; B32B 7/00; B32B 7/10; B32B 7/12; B32B 37/00; B32B 37/10; B32B 37/18; B32B 37/182; B32B 37/14; B32B 37/146; B60N 3/00; B60N 3/02; B60N 3/04

See application file for complete search history.

(56) References Cited

U.S. PATENT DOCUMENTS

| | | | |
|---|---|---|---|
| 3,750,525 A | | 8/1973 | Waters et al. |
| 4,717,612 A | | 1/1988 | Shackelford |
| 5,026,445 A | | 6/1991 | Mainolfi et al. |
| 5,074,726 A | | 12/1991 | Betchel et al. |
| 5,253,962 A | | 10/1993 | Close, Jr. |
| 5,298,694 A | | 3/1994 | Thompson et al. |
| 5,316,604 A | | 5/1994 | Fell |
| 5,370,521 A | | 12/1994 | McDougall |
| 5,423,933 A | | 6/1995 | Horian |
| 5,502,930 A | | 4/1996 | Burkette et al. |
| 5,534,097 A | | 7/1996 | Fasano et al. |
| 5,683,782 A | | 11/1997 | Duchene |
| 5,744,210 A | | 4/1998 | Hofmann et al. |
| 5,750,160 A | | 5/1998 | Weber et al. |
| 5,915,445 A | | 6/1999 | Rauenbusch |
| 5,979,962 A | | 11/1999 | Balentin et al. |
| 6,030,490 A | * | 2/2000 | Francisco ............... B29C 65/04 156/274.4 |
| 6,050,630 A | | 4/2000 | Hochet |
| 6,066,217 A | | 5/2000 | Dibble et al. |
| 6,102,464 A | | 8/2000 | Schneider et al. |
| 6,102,630 A | | 8/2000 | Schneider et al. |
| 6,435,577 B1 | | 8/2002 | Renault |
| 6,537,413 B1 | * | 3/2003 | Hochet ................. B29C 70/088 156/297 |
| 6,615,762 B1 | | 9/2003 | Scott |
| 6,631,785 B2 | | 10/2003 | Khambete et al. |
| 6,655,299 B2 | | 12/2003 | Preisler et al. |
| 6,659,223 B2 | | 12/2003 | Allison et al. |
| 6,682,675 B1 | | 1/2004 | Vandangeot et al. |
| 6,682,676 B1 | | 1/2004 | Renault et al. |
| 6,748,876 B2 | | 6/2004 | Preisler et al. |
| 6,752,443 B1 | | 6/2004 | Thompson et al. |
| 6,790,026 B2 | | 9/2004 | Vandangeot et al. |
| 6,793,747 B2 | | 9/2004 | North et al. |
| 6,823,803 B2 | | 11/2004 | Preisler |
| 6,825,803 B2 | | 11/2004 | Wixforth et al. |
| 6,843,525 B2 | * | 1/2005 | Preisler ............... B62D 25/2054 296/184.1 |
| 6,890,023 B2 | | 5/2005 | Preisler et al. |
| 6,905,155 B1 | | 6/2005 | Presley et al. |
| 6,926,348 B2 | | 8/2005 | Krueger et al. |
| 6,945,594 B1 | | 9/2005 | Bejin et al. |
| 6,981,863 B2 | | 1/2006 | Renault et al. |
| 7,014,259 B2 | | 3/2006 | Heholt |
| 7,059,646 B1 | | 6/2006 | DeLong et al. |
| 7,059,815 B2 | | 6/2006 | Ando et al. |
| 7,090,274 B1 | | 8/2006 | Khan et al. |
| 7,093,879 B2 | | 8/2006 | Putt et al. |
| 7,121,601 B2 | | 10/2006 | Mulvihill et al. |
| 7,188,881 B1 | | 3/2007 | Sturt et al. |
| 7,207,616 B2 | | 4/2007 | Sturt |
| 7,222,915 B2 | | 5/2007 | Philippot et al. |
| 7,264,685 B2 | | 9/2007 | Katz et al. |
| 7,316,788 B2 | | 1/2008 | Autrey et al. |
| 7,320,739 B2 | | 1/2008 | Thompson, Jr. et al. |
| 7,402,537 B1 | | 7/2008 | Lenda et al. |
| 7,419,713 B2 | | 9/2008 | Wilkens et al. |
| 7,530,322 B2 | | 5/2009 | Angelini |
| 7,628,440 B2 | | 12/2009 | Berhardsson et al. |
| 7,713,011 B2 | | 5/2010 | Orszagh et al. |
| 7,837,009 B2 | | 11/2010 | Gross et al. |
| 7,854,211 B2 | | 12/2010 | Rixford |
| 7,909,379 B2 | | 3/2011 | Winget et al. |
| 7,918,313 B2 | | 4/2011 | Gross et al. |
| 7,919,031 B2 | | 4/2011 | Winget et al. |
| 7,942,475 B2 | | 5/2011 | Murray |
| 7,963,243 B2 | | 6/2011 | Quigley |
| 8,069,809 B2 | | 12/2011 | Wagenknecht et al. |
| 8,117,972 B2 | | 2/2012 | Winget et al. |
| 8,133,419 B2 | | 3/2012 | Burks et al. |
| 8,298,675 B2 | | 11/2012 | Allessandro et al. |
| 8,475,884 B2 | | 7/2013 | Kia |
| 8,622,456 B2 | | 1/2014 | Preisler et al. |
| 8,690,233 B2 | | 4/2014 | Preisler et al. |
| 8,764,089 B2 | | 7/2014 | Preisler et al. |
| 8,795,465 B2 | | 8/2014 | Preisler et al. |
| 8,795,807 B2 | | 8/2014 | Preisler et al. |
| 8,808,827 B2 | | 8/2014 | Preisler et al. |
| 8,808,828 B2 | | 8/2014 | Preisler et al. |
| 8,808,829 B2 | | 8/2014 | Preisler et al. |
| 8,808,830 B2 | | 8/2014 | Preisler et al. |
| 8,808,831 B2 | | 8/2014 | Preisler et al. |
| 8,808,833 B2 | | 8/2014 | Preisler et al. |
| 8,808,834 B2 | | 8/2014 | Preisler et al. |
| 8,808,835 B2 | | 8/2014 | Preisler et al. |
| 8,834,985 B2 | | 8/2014 | Preisler et al. |
| 8,852,711 B2 | | 8/2014 | Preisler et al. |
| 8,859,074 B2 | | 8/2014 | Preisler et al. |
| 8,883,285 B2 | * | 8/2014 | Preisler et al. |
| 2004/0078929 A1 | | 4/2004 | Schoemann |
| 2005/0189674 A1 | | 9/2005 | Hochet et al. |
| 2006/185866 A1 | | 8/2006 | Jung et al. |
| 2006/0008609 A1 | | 10/2006 | Snyder et al. |
| 2006/0255611 A1 | | 11/2006 | Smith et al. |
| 2007/0065264 A1 | | 3/2007 | Sturt et al. |
| 2007/0069542 A1 | | 3/2007 | Steiger et al. |
| 2007/0256379 A1 | | 11/2007 | Edwards |
| 2007/0258786 A1 | | 11/2007 | Orszagh et al. |
| 2008/0185866 A1 | | 5/2008 | Jeong et al. |
| 2009/0108639 A1 | | 4/2009 | Sturt et al. |
| 2010/0026031 A1 | | 2/2010 | Jouraku |
| 2010/0086728 A1 | | 4/2010 | Theurl et al. |
| 2010/0206467 A1 | | 8/2010 | Durand et al. |
| 2011/0260359 A1 | | 10/2011 | Durand et al. |
| 2011/0315310 A1 | * | 12/2011 | Trevisan ............... B29C 70/68 156/245 |
| 2012/0247654 A1 | | 10/2012 | Piccin et al. |
| 2012/0315429 A1 | | 12/2012 | Stamp et al. |
| 2013/0031752 A1 | | 2/2013 | Davies |
| 2013/0075955 A1 | | 3/2013 | Piccin et al. |
| 2013/0137798 A1 | | 5/2013 | Piccin |

(56) References Cited

U.S. PATENT DOCUMENTS

| | | |
|---|---|---|
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0154461 A1 | 6/2014 | Preisler et al. |
| 2014/0225296 A1 | 8/2014 | Preisler et al. |
| 2014/0335303 A1 | 11/2014 | Preisler et al. |

\* cited by examiner

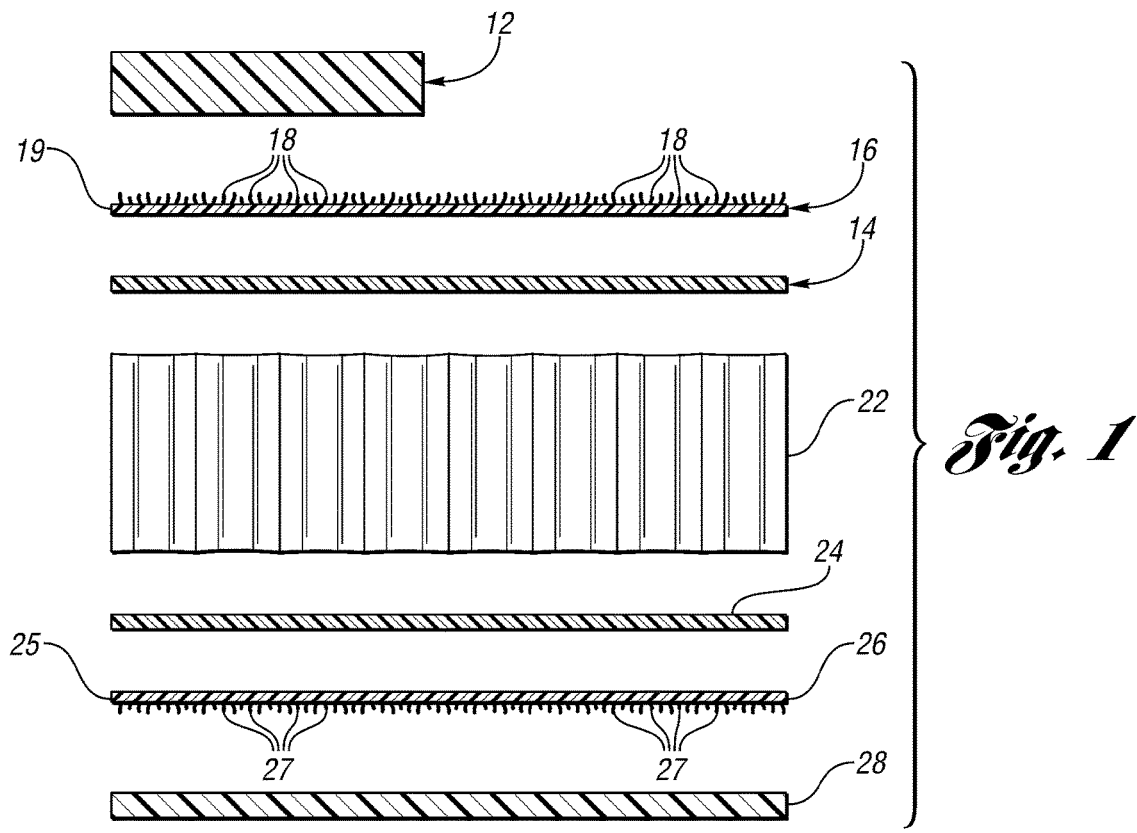
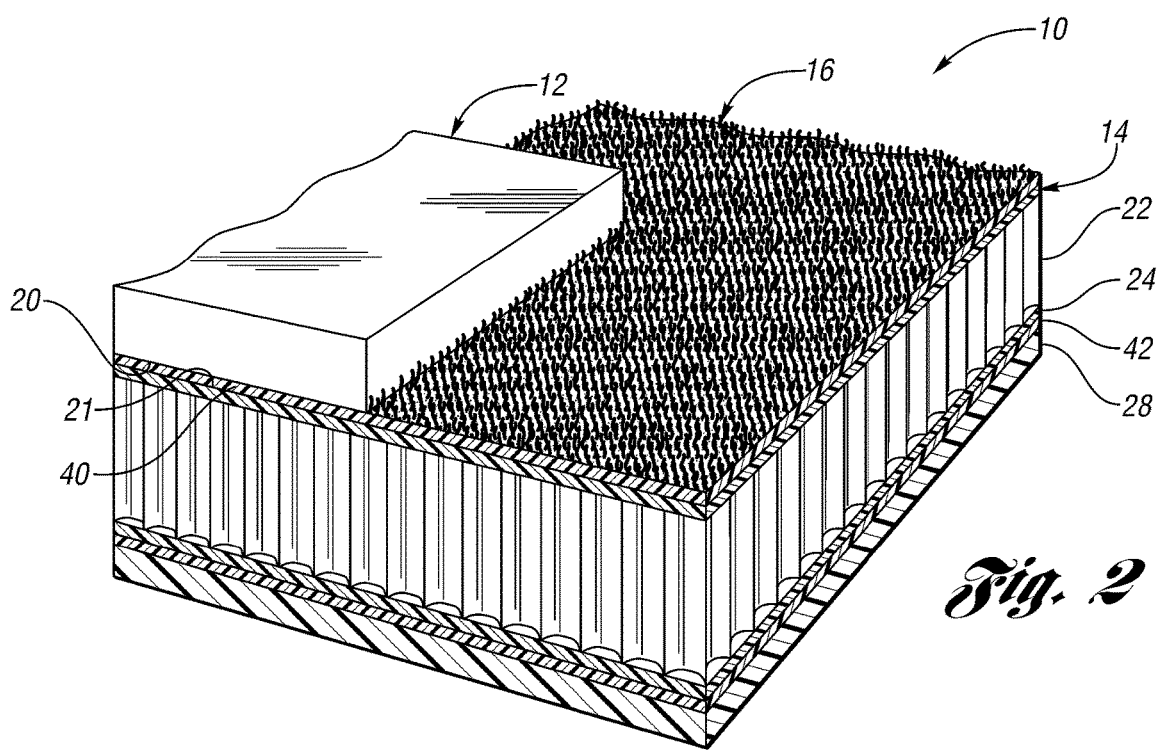

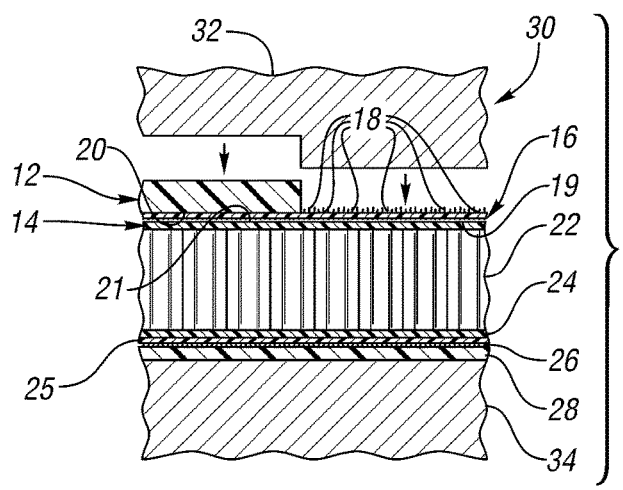
Fig. 3
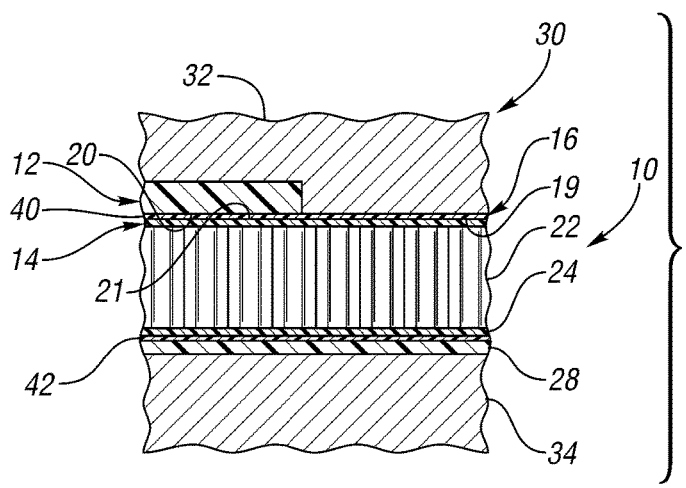
Fig. 4
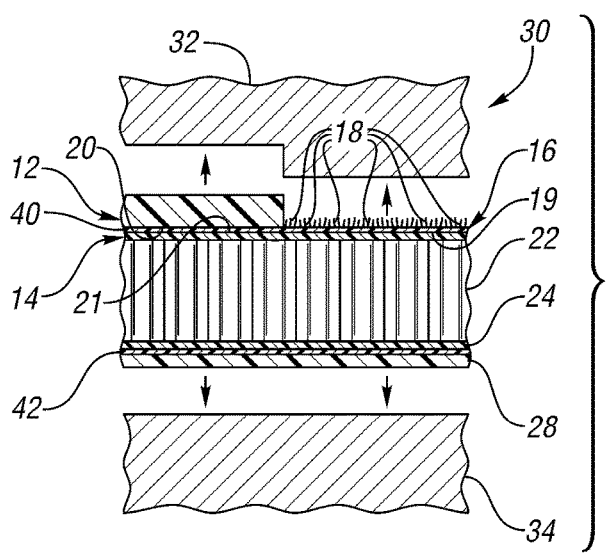
Fig. 5
Fig. 6

METHOD OF BONDING A THERMOPLASTIC COMPONENT TO A CARPETED COMPONENT

CROSS REFERENCE TO RELATED APPLICATION

This application is a Continuation of U.S. application Ser. No. 13/517,877 filed Jun. 14, 2012.

TECHNICAL FIELD OF THE INVENTION

This invention relates, in general, to the field of plastics joining technologies and, in particular, to methods of bonding a thermoplastic component to a carpeted component.

OVERVIEW

A wide variety of welding technologies exist to join or bond plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies.

Also, a wide variety of adhesives such as liquid and heat-sensitive solid film adhesive may be used to join plastic components together. Oftentimes a mold is used in the bonding process. U.S. Pat. Nos. 8,133,419; 5,534,097 and 2011/0315310 are examples.

It is often desirable to attach or bond a plastic component to a carpeted component. Such carpeted plastic components are shown or described in the following U.S. Pat. Nos. 5,026,445; 6,050,630; 6,537,413; 6,748,876; 6,823,803; 7,919,031; 7,909,379; and 2005/0189674.

SUMMARY OF EXAMPLE EMBODIMENTS

An object of at least one embodiment of the present invention is to provide a method of bonding a thermoplastic component to a carpeted component wherein the carpet is transformed to be a binder thereby resulting in a finished article being a strong bond between the components, and a pleasing appearance.

Another object of at least one embodiment of the present invention is to provide a method of bonding a thermoplastic component to a carpeted component in such a way that results in a number of flexible design options.

In carrying out the above objects and other objects of at least one embodiment of the present invention, a method of bonding a thermoplastic component to a carpeted component is provided. The method includes providing a base component, a thermoplastic component and a fibrous carpet between the components. The carpet has a large number of cavities. The carpet overlies and is in contact with the base component. The thermoplastic component overlies and is in contact with the carpet. The carpet is made of a thermoplastic material adapted to bond to the thermoplastic component in response to heat at the interface between the thermoplastic component and the carpet. The method also includes heating the thermoplastic component and the carpet at the interface between the thermoplastic component and the carpet for a period of time to soften the carpet. The method finally includes pressing the components and the softened carpet together under a pressure to cause the softened carpet to flow and at least partially fill the cavities. The carpet at the interface is transformed into a solid bonding layer to bond the components together to create a finished structure.

The carpet may be a decorative carpet made of woven or non-woven fibers.

The carpet may have an upper thermoplastic fiber layer and a lower thermoplastic backing layer.

At least a portion of the carpet may bond the components together.

The entire carpet may bond the components together.

The thermoplastic of the carpet and the thermoplastic of the thermoplastic component may be polypropylene.

The thermoplastic of the carpet and the thermoplastic of the thermoplastic component may be polyester.

The step of heating may occur before the step of pressing wherein the components and the fabric are cold-pressed during the step of pressing.

The base component may be a skin or layer made of a reinforced thermoplastic material.

The carpet may have a surface area greater than a surface area of the thermoplastic component wherein a portion of the carpet spaced away from the interface is not transformed and forms an outer exterior surface of the finished structure. The carpet may be a decorative carpet wherein the portion of the outer exterior surface is a decorative surface.

The step of heating may occur during the step of pressing and the thermoplastic component and the carpet are welded to each other at the interface.

A temperature at the interface may lie in a range of 160° C. to 200° C. during the step of heating.

The pressure may lie in a range of $1 \times 10^6$ Pa to $3 \times 10^6$ Pa. Both of the components may be heated to a temperature above a softening temperature of the carpet during the step of heating. The step of pressing may include the step of press molding in a compression mold.

Further in carrying out the above objects and other objects of at least one embodiment of the present invention, a method of bonding thermoplastic components together is provided. The method includes providing first and second thermoplastic components and a fibrous carpet having a large number of cavities between the components. The carpet overlies and is in contact with the first component. The second component overlies and is in contact with the carpet. The carpet is made of a thermoplastic material adapted to bond to the first and second thermoplastic components in response to heat at the interfaces between the components and the carpet. The method also includes heating the components to a temperature above a softening temperature of the carpet. Heat from the heated components heats the carpet at the interfaces between the components and the carpet for a period of time to soften the carpet. The method finally includes pressing the components and the softened carpet together under a pressure to cause the softened carpet to flow and at least partially fill the cavities in the carpet. The carpet at the interfaces is transformed into a solid bonding layer to bond the components together to create a finished structure.

Still further in carrying out the above objects and other objects of at least one embodiment of the invention, a method of bonding thermoplastic components together is provided. The method includes providing first and second thermoplastic components and a fibrous mat having a large number of cavities between the components. The mat overlies and is in contact with the first component. The second component overlies and is in contact with the mat. The mat is made of a thermoplastic material adapted to bond to the first and second thermoplastic components in response to heat at the interfaces between the components and the mat. The method also includes heating the components to a temperature above a softening temperature of the mat. Heat from the heated components heats the mat at the interfaces between the components and the mat for a period of time to soften the mat. The method further includes pressing the components and the softened mat together under a pressure to cause the softened mat to flow and at least partially fill the cavities in the mat. The mat at the interfaces is transformed into a solid bonding layer to bond the components together to create a finished structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

BRIEF DESCRIPTION OF THE DRAWINGS

FIG. 1 is a side sectional view of a stack of components which are heated and pressed together to form the finished structure of FIG. 2;

FIG. 2 is a perspective view, partially broken away and in cross section, of a finished structure constructed in accordance with at least one embodiment of a method of the present invention;

FIG. 3 is a side view, partially broken away and in cross section, of a compression mold in its open position and the components of FIG. 2 located between two mold halves of the mold;

FIG. 4 is a view similar to the view of FIG. 3 with the mold halves pressed together in their closed position;

FIG. 5 is a view similar to the view of FIG. 3 with the mold again in its open position after pressing with the finished structure ready for removal from the mold; and FIG. 6 is a side view, partially broken away and in cross section, of a woven carpet or mat for use in the method of at least one embodiment of the present invention.

DETAILED DESCRIPTION OF THE EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the drawing Figures, FIGS. 2 and 5 show a finished structure, generally indicated at 10, constructed in accordance with at least an embodiment of the present invention. The various components of the finished structure 10 prior to creation of the finished structure are shown in FIGS. 1 and 3. In general, the method of the invention provides a method of bonding at least one thermoplastic component, generally indicated at 12, to a carpeted thermoplastic base component, generally included at 14.

The method includes the steps of providing the base component 14, the thermoplastic component 12 and a fibrous decorative carpet, generally indicated at 16, between the components 12 and 14. The carpet 16 preferably includes an upper thermoplastic fibrous layer including thermoplastic fibers 18 and a lower thermoplastic backing layer 19. The carpet 16 has a large number of cavities between the fibers 18 of the fibrous layer. As shown in FIGS. 2-5, the carpet 16 overlies and is in contact with the base component 14 and the thermoplastic component 12 overlies and is in contact with the carpet 16. The upper and lower layers of the carpet 16 are preferably made of a thermoplastic material adapted to bond to the thermoplastic components 12 and 14, respectively, in response to heat at the interfaces 20 and 21 (FIGS. 2-5) between the thermoplastic components 12 and 14, respectively, and the carpet 16.

The base component 14 is preferably a reinforced thermoplastic skin. The method may also include the step of providing a cellular thermoplastic core 22, a second reinforced thermoplastic skin 24 and a second decorative thermoplastic fibrous carpet 26. The carpet 26 preferably includes an upper thermoplastic fiber layer including thermoplastic fibers 27 and a lower thermoplastic backing layer 25. The carpet 26 has a large number of cavities between the fibers 27. Also provided is a second thermoplastic component 28 preferably in the form of a thermoplastic sheet which preferably completely covers or overlies the carpet 26.

All (as shown in FIGS. 3-5) or a subset of the components 12-28 are placed or inserted in a compression mold, generally indicated at 30, including an upper mold half 32 and a lower mold half 34. The mold 30 may be heated (if the components 12-28 are not pre-heated) or may be a cold-pressing mold (if the components are pre-heated outside the mold 30). FIG. 3 shows the mold 30 in its open position to receive the components 12-28 and the mold is shown in its closed, pressing position in FIG. 4. FIG. 5 shows the mold 30 again open to allow the created finished structure 10 to be removed from the mold 30.

The method of at least one embodiment of the present invention includes heating (either inside or outside the mold 30) the thermoplastic component 12 and the carpet 16 at the interface 20 between the thermoplastic component 12 and the carpet 16 for a period of time to soften the thermoplastic of the carpet 16.

Preferably, the component 14 is also heated (either inside or outside the mold 30) to heat the carpet 16 at the interface 21 between the component 14 and the carpet 16. If so included in the finished article 10, the other components 22-28 are also heated either in or outside of the mold 30 to soften the thermoplastic of the carpet 26 at the interfaces between the components 24 and 28 and the carpet 26.

The method of at least one embodiment of the present invention also includes pressing the components 12 and 14 and the softened carpet 16 together under a pressure in the mold 30 to cause the softened carpet 16 to flow and at least partially fill the cavities between the fibers 18 wherein a portion of the carpet 16 at the interfaces 20 and 21 is transformed into a solid bonding layer 40 (FIG. 5) to bond the components 12 and 14 together to at least partially create the finished structure 10.

If so included in the finished article, the other components 22-28 are also pressed together with the heated components 12-16 in the mold 30. In this way, the softened carpet 26 flows and at least partially fills the cavities between its fibers 27 wherein the entire carpet 26 is transformed into a second solid bonding layer 42 (FIG. 5) to bond the components 24 and 28 together to help create the finished structure 10.

One or both of the carpets 16 and 26 may be a decorative carpet having upper and/or lower layers made of woven (i.e. FIG. 6) or non-woven fibers. Typically, the carpets 16 and 26 have an upper thermoplastic fibrous layer having fibers 18 and 27, respectively, and a lower thermoplastic bonding layer 19 and 25, respectively.

As shown in FIG. 5, the solid portion or layer 40 of the upper carpet 16 bonds the components 12 and 14 together while the entire lower carpet 26 as thermoformed into the solid bonding layer 42 bonds the components 24 and 28 together.

The thermoplastic of the components 12-28 may preferably be polypropylene or polyester. Other compatible thermoplastics, however, may also be used. A temperature at one or more of the interfaces typically lies in a range of 160° C. to 200° C. during the step of heating and the pressure in the mold 30 typically lies in a range of $1 \times 10^6$ Pa to $3 \times 10^6$ Pa.

The step of heating may occur either before or during the step of pressing. For example, the thermoplastic component may be welded to the carpet thereby joining the thermoplastic component to the carpet. Such welding may be ultrasonic welding, vibration welding; thermal welding; spin welding; infrared welding; hot plate welding or laser welding.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of bonding thermoplastic components to a carpeted component to form a sandwich-type article, the method comprising:

providing a set of article components, the set of article components including a thermoplastic component, a first thermoplastic carpet, a first reinforced thermoplastic skin, a cellulose-based core, a second reinforced thermoplastic skin, a second thermoplastic carpet, and a covering layer, the first thermoplastic carpet being adapted to bond to the thermoplastic component and the first reinforced thermoplastic skin upon becoming fluent under application of heat, the second thermoplastic carpet being adapted to bond to the covering layer and the second reinforced thermoplastic skin upon becoming fluent under application of the heat;

heating the set of article components sufficiently to cause the first thermoplastic carpet to become fluent in the area where the first thermoplastic carpet is to be bonded to the thermoplastic component and the first reinforced thermoplastic skin and to cause the second thermoplastic carpet to become fluent in the area where the second thermoplastic carpet is to be bonded to the covering layer and the second reinforced thermoplastic skin;

placing, in a compression mold, the covering layer, the second thermoplastic caret overlying and in contact with the covering layer, the second reinforced thermoplastic skin overlying and in contact with the second thermoplastic carpet, the cellulose-based core overlying and in contact with the second reinforced thermoplastic skin, the first reinforced thermoplastic skin overlying and in contact with the cellulose-based core, the first thermoplastic carpet overlying and in contact with the first reinforced thermoplastic skin, the thermoplastic component overlying and in contact with the first thermoplastic carpet;

closing the compression mold and applying substantially uniform pressure over the surface area of the set of article components to cause the set of article components to bond into a sandwich-type article in a single pressing operation, the bonding including to cause the fluent thermoplastic of the first thermoplastic carpet to form a solid bonding layer at its interfaces with the thermoplastic component and the first reinforced thermoplastic skin, as well as to cause the fluent thermoplastic of the second thermoplastic carpet to form a solid bonding layer at its interfaces with the covering layer and the second reinforced thermoplastic skin; and removing the bonded components from the mold as a sandwich-type article.

2. The method as claimed in claim 1, wherein the step of heating the set of article components occurs prior to the placing step.

3. The method as claimed in claim 1, wherein the step of heating the set of article components occurs after the placing step.

4. The method as claimed in claim 1, wherein the thermoplastic of the first thermoplastic carpet and the second thermoplastic carpet is polypropylene.

5. The method as claimed in claim 1, wherein the thermoplastic of the thermoplastic carpet and the thermoplastic of the second thermoplastic carpet is polyester.

6. The method as claimed in claim 1, wherein the first thermoplastic carpet has a surface area greater than a surface area of the thermoplastic component and wherein a portion of the first thermoplastic carpet spaced away from the interface forms an outer exterior surface of a finished structure.

7. The method as claimed in claim 1, wherein the heating step occur during the application of substantially uniform pressure over the surface area of the set of article components and wherein the set of article components including the fluent first and second thermoplastic carpets are thereby welded to each other at their interfaces.

8. The method as claimed in claim 1, wherein the temperatures of the set of article components in the heating step lie in a range of 160° C. to 200° C.

9. The method as claimed in claim 1, wherein the pressure lies in a range of $1 \times 106$ Pa to $3 \times 106$ Pa.

* * * * *